Nov. 10, 1942.　　　R. J. OLANDER　　　2,301,443
SHOCK ABSORBING MECHANISM
Filed Oct. 31, 1940　　　2 Sheets-Sheet 1
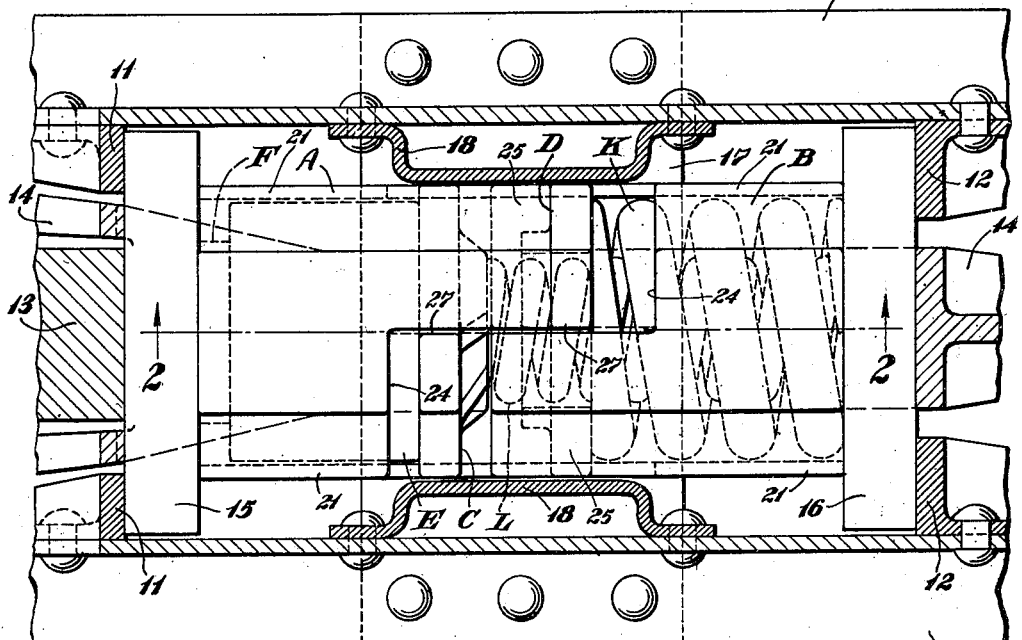
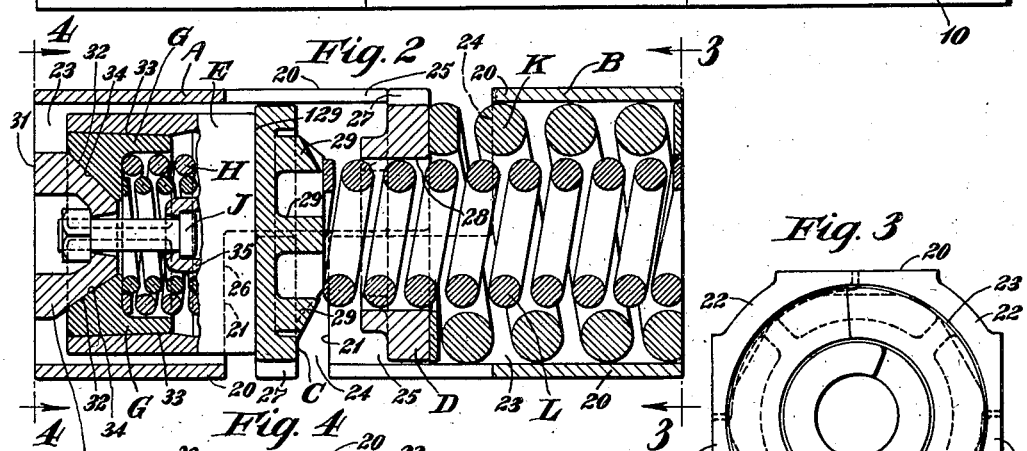
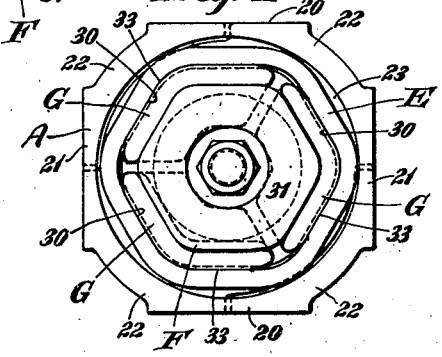
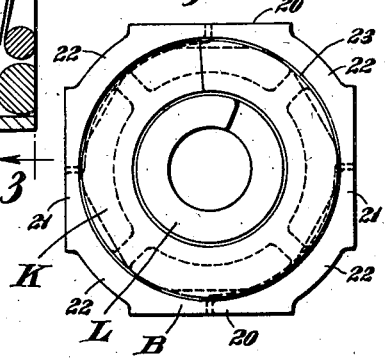
Inventor
Roland J. Olander
By Henry Fuchs.
Atty.

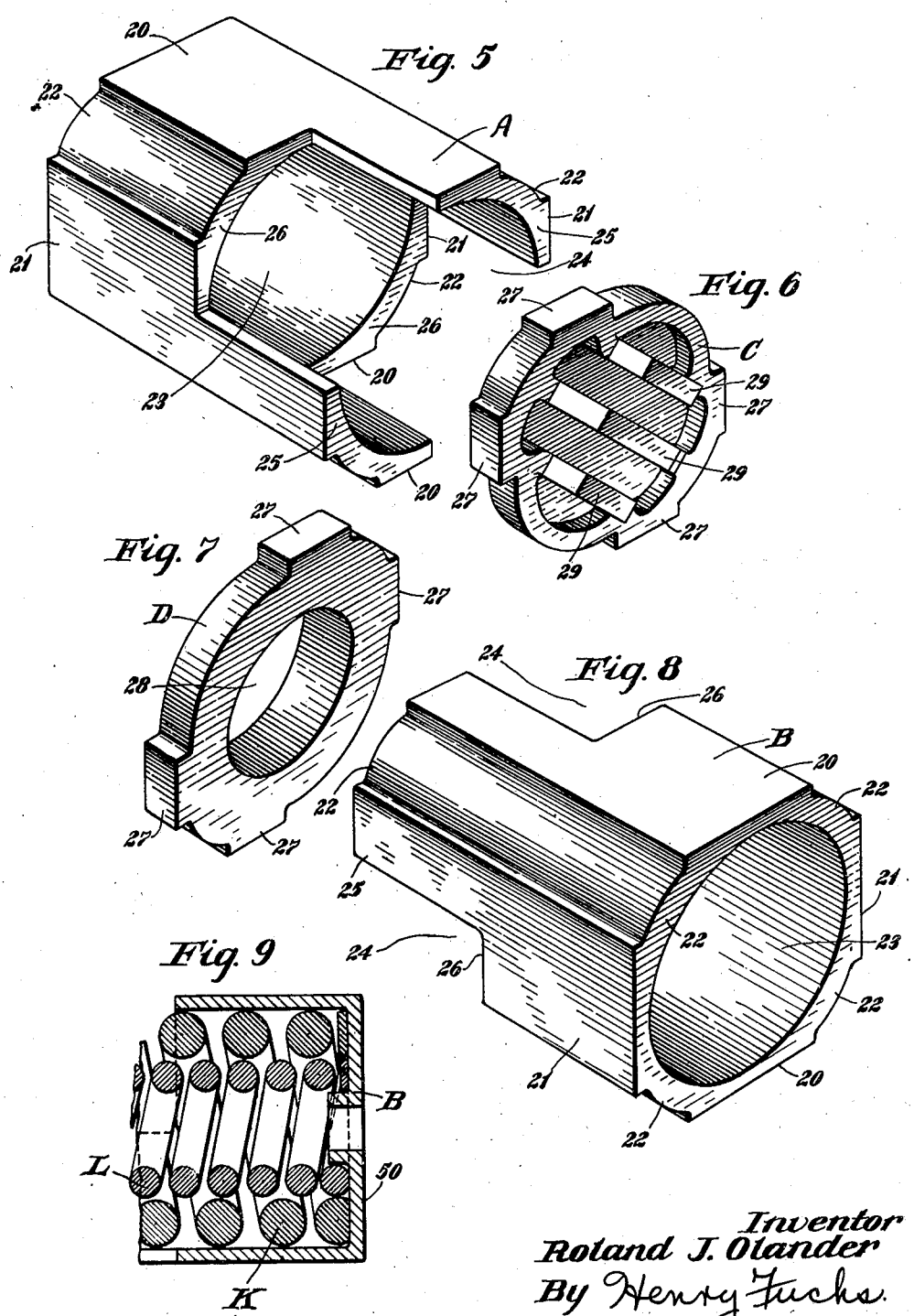

Patented Nov. 10, 1942

2,301,443

UNITED STATES PATENT OFFICE 2,301,443

SHOCK ABSORBING MECHANISM

Roland J. Olander, Chicago, Ill., assignor to W. H. Miner, Inc., Chicago, Ill., a corporation of Delaware Application October 31, 1940, Serial No. 363,594

12 Claims. (Cl. 213—24)

This invention relates to improvements in shock absorbing mechanisms.

One object of the invention is to provide a shock absorbing mechanism more particularly adapted for railway draft riggings having initial spring capacity for absorbing the lighter shocks, together with additional frictional resistance combined with spring action to absorb the heavier shocks to which the draft rigging is subjected.

Another object of the invention is to provide a friction device comprising a friction casing, a friction clutch and spring resistance combined with a spring device so arranged and designed that the friction device becomes active only after a predetermined compression of the spring device and is compressed in tandem with the latter during the remainder of the compression stroke of the entire mechanism.

A further object of the invention is to provide a combined friction and spring shock absorbing mechanism having initial spring action followed by combined frictional and spring resistance, wherein the friction mechanism comprises a complete shock absorbing unit including a friction clutch, a casing in which the clutch is slidable and spring means within the casing cooperating with the clutch, and the spring mechanism comprises a plurality of shock absorbing springs, one of which yieldingly resists bodily movement of the friction device during the initial action of the mechanism to hold the friction device tightly against the cooperating follower of the rigging.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith, the front and rear main followers of the rigging and the improved shock absorbing mechanism being shown in plan. Figure 2 is a longitudinal, vertical sectional view of the shock absorbing mechanism proper, corresponding substantially to the line 2—2 of Figure 1. Figure 3 is a rear end elevational view of the mechanism shown in Figure 2, looking in the direction of the arrows 3—3. Figure 4 is a front end elevational view of the mechanism shown in Figure 2, looking in the direction of the arrows 4—4. Figure 5 is a perspective view of the front casing of the shock absorbing mechanism. Figure 6 is a perspective view of the front intermediate follower. Figure 7 is a perspective view of the rear intermediate follower. Figure 8 is a perspective view of the rear casing of the mechanism. Figure 9 is a longitudinal vertical sectional view of the rear end portion of the rear casing partly broken away and illustrating another embodiment of the invention.

In said drawings, 10—10 indicate channel-shaped center or draft sills of a railway car underframe to the inner faces of which are secured front and rear stop lugs 11—11 and 12—12. The inner end portion of the drawbar is indicated at 13, to which is operatively secured a hooded yoke 14 of well-known construction. Within the yoke are disposed the usual front and rear followers 15 and 16 and the shock absorbing mechanism proper. The yoke and parts therewithin are supported in operative position by a detachable saddle plate 17 and the shock absorbing mechanism is held properly centered between the sills by guide brackets 18—18 secured to the inner sides of said sills.

Referring first to the embodiment of the invention illustrated in Figures 1 to 8 inclusive, the improved shock absorbing mechanism proper, as shown, comprises broadly a front casing or column element A; a rear casing or column element B; a front intermediate follower C; a rear intermediate follower D; a friction shell or casing E; a wedge block F; three friction shoes G—G—G; a spring resistance H within the shell E; a retainer bolt J; a relatively heavy outer coil spring K; and a relatively lighter inner coil spring L.

The two casings A and B are preferably of identical construction. Each of these casings, as shown, comprises horizontally disposed top and bottom walls 20—20 and vertically disposed side walls 21—21. The four corners of each casing are cut away, as shown, providing curved corner walls 22—22 and longitudinally disposed reenforcing ribs at the junctions between the corner walls and the corresponding top, bottom, and side walls. The two casings are reversely arranged end for end, the outer ends of the two casings bearing respectively on the front and rear followers 15 and 16 of the draft rigging. Each casing is open at the outer end, and has a longitudinal cylindrical opening or pocket 23 adapted to accommodate either the friction gear or the springs K and L. At its inner end, that is, the end remote from the main follower on which it bears, each casing is cut away or recessed at diagonally opposite corners, as indicated at 24—24, providing a pair of longitudinally extending arms 25—25 at the inner end of each casing. As shown, the cut away portions include slightly more than half of the corresponding top, bottom, and side walls of the casing. The two arms 25 have concave inner surfaces which are continuations of the inner surface of the corresponding pocket 23. Each arm also has a convex outer surface which is a continuation of the outer surface of the corresponding corner wall 22 and two flat outer surfaces which are continuations of the outer surfaces of the corresponding walls of the casing, the flat surfaces of each arm being disposed at right angles to each other. At the inner end of each cut away section 24 each casing is provided with a flat transversely extending limiting stop shoulder 26 for a purpose hereinafter described. As will be evident, each casing forms a rigid column element for transmitting forces.

The front and rear intermediate followers C and D are of like construction, except as hereinafter pointed out. Each intermediate follower, as shown in Figures 6 and 7, is in the form of a relatively heavy, substantially flat platelike member of generally circular outline having extensions 27—27 at diametrically opposite sides thereof, corresponding in outline to the end faces of the corresponding arms 25—25. Between the extensions 27—27 each plate is of circular outline, the diameter of the circular portion being slightly less than the diameter of the cylindrical opening of each casing A and B. Each intermediate follower is slidably disposed between the arms 25—25 of the corresponding casing, the extensions 27—27 being slidably disposed in the openings 24—24 with the circular edges fitting the concave inner surfaces of the two arms 25—25. The rear intermediate follower D, which is slidingly disposed between the arms of the rear casing B, is provided with a central opening 28 of circular outline, while the front intermediate follower C is solid, that is, a continuous plate having no central opening. As shown in Figure 6, the intermediate follower C is provided with transverse reenforcing ribs 29—29—29 having flat end faces which provide a seat for the inner coil L of the spring means. The opening 28 of the rear intermediate follower D is of such a size as to freely accommodate the central coil L of the spring, which coil extends therethrough.

The friction shell E is of generally hexagonal contour being closed at the rear end by a transverse vertical wall 129. The shell E is of such a size as to telescope loosely within the opening 23 of the casing A so that it is freely movable lengthwise of said casing. The interior of the shell E is of hexagonal cross section and is inwardly tapered at its open front end, thus presenting six inwardly converging frictional faces arranged symmetrically about the longitudinal axis of the shell and providing three surfaces 30—30—30 of V-shaped cross section.

The wedge block F has a flat outer end face 31 adapted to bear on the front follower 15. At the inner end the block F is formed with three flat wedge faces 32—32—32 arranged symmetrically about the longitudinal axis of the mechanism.

The three friction shoes G—G—G are of similar design, each having an outer V-shaped friction surface 33 in sliding frictional engagement with one of the V-shaped friction surfaces 30 of the shell, and a flat wedge face 34 on an enlargement on the inner side thereof in wedging engagement with one of the faces 32 of the wedge block. The inner enlargements of the shoes present transverse flat abutment faces at their inner ends on which the spring resistance H is adapted to bear.

The spring resistance H comprises inner and outer coils having their opposite ends bearing respectively on the shoes and rear wall of the friction shell E.

The retainer bolt J holds the friction device assembled and of overall uniform length, having the head thereof, which is at the rear end of the same, anchored in a hollow boss 35 extending inwardly from the rear wall of the friction shell and having the nut thereof, which is at the front end, accommodated in an opening of the wedge block and adapted to shoulder on the rear wall of said opening.

The friction device or friction shock absorber operates in the usual manner, the wedge being forced inwardly in compression to spread the shoes apart and force the same rearwardly against the resistance of the spring resistance H. High frictional resistance is thus created between the shoes and the friction surfaces of the shell on which the shoes slide. When the actuating pressure is reduced, the spring resistance H returns the parts to the normal full release position shown in Figure 2.

The springs K and L are disposed within the rear casing B, the outer coil K being relatively heavy and bearing at its front and rear ends respectively on the rear intermediate follower D and the rear main follower 16. The lighter inner coil L has its front and rear ends bearing respectively on the front intermediate follower C and the rear main follower 16.

In assembling the shock absorbing mechanism the friction device, including the shell E, wedge F, shoes G—G—G, and spring H is inserted in the pocket of the casing A and the front intermediate follower C is assembled with this casing to slide between the arms 25—25 thereof with the extensions 27—27 working in the corresponding openings 24—24, and the springs K and L are inserted in the pocket of the casing B and the rear intermediate follower D is assembled with the last named casing to slide between the arms 25—25 thereof with the extensions 27—27 working in the corresponding openings 24—24 and having the spring L extending through the central opening of said rear intermediate spring follower D.

The two casings A and B with the parts therein are then assembled with each other so that the two arms 25—25 of the front casing A will be telescoped and slide with respect to the two arms 25—25 of the rear casing B, as best illustrated in Figure 1. It will be evident that when the parts are thus assembled, the rear ends of the arms of the front casing will bear on the rear intermediate follower D. However, the front ends of the arms of the rear casing B will be held rearwardly spaced from the front intermediate follower C due to the spring L holding this follower against the rear end of the friction shell E of the friction shock absorber, the friction shock absorber being of such an overall length from the front face of the wedge block F to the rear end of the shell as to accomplish this result. As will be further seen upon reference to Figure 2, the front intermediate follower is held rearwardly spaced from the stop shoulders 26—26 of the casing A.

The operation of my improved shock absorbing mechanism illustrated in Figures 1 to 8 inclusive is as follows: Upon a draft or buffing force being applied to the drawbar 13, the mechanism is compressed between the front and rear followers 15 and 16 of the rigging, the rear follower 16 being pulled forwardly by the yoke 14 as the drawbar is pulled outwardly in draft, thereby compressing the mechanism against the front follower 15, which at this time is held stationary by engagement with the front stop lugs 11—11 against which it bears, and the front follower 15 being forced rearwardly in buff by the drawbar as the latter is forced inwardly, thereby compressing the mechanism against the rear follower 16, which at this time is held stationary by the rear stop lugs 12—12.

During compression of the mechanism the casings A and B which bear respectively on the front and rear followers 15 and 16 are moved toward each other lengthwise of the mechanism. The rear intermediate follower D, which is engaged by the rear ends of the arms 25—25 of the front follower casing A, is thus moved rearwardly toward the rear casing B and the rear follower 16, in buff, and the front intermediate follower C, which bears on the friction shell E of the friction device, is moved rearwardly in unison with said friction device which is of greater shock absorbing capacity than the spring L which opposes rearward movement of said front intermediate follower. During draft action the rear casing B is moved forwardly in unison with the rear main follower, while the rear intermediate follower D is held stationary by contact with the rear ends of the arms 25—25 of the front casing A which bears on the front follower 15, which at this time is held stationary, and the front intermediate follower is held stationary by engagement with the rear end of the friction shell E of the friction device.

Thus, during the first part of the compression stroke of the mechanism, the spring K is compressed between the rear intermediate follower D and the rear main follower 16, and the spring L is compressed between the front intermediate follower C and the rear main follower 16. This action continues until the clearance between the front intermediate follower C and the outer ends of the arms 25—25 of the rear casing B has been taken up, whereupon the friction device is positively compressed between the casing B and the front main follower 15. During this compression of the friction device, compression of the spring K is continued between the rear main follower 16 and the rear intermediate follower D, the friction device and the spring K acting in tandem. This tandem action continues until the end of the compression stroke of the mechanism when further relative movement of the casings A and B is arrested by engagement of the front intermediate follower C with the stop shoulders 26—26 of the casing A and engagement of the rear intermediate follower with the stop shoulders 26—26 of the casing B. In this connection it is pointed out that engagement between the front intermediate follower C and the stop shoulders 26—26 of the casing A also determines the limit of compression of the friction device.

When relative movement of the casings has been limited in the manner described, the force is transmitted from the front to the rear main follower through the front and rear casings A and B and the intermediate followers C and D, which together act as a solid column load transmitting member, thereby relieving the springs K and L and the friction device of the shock absorbing mechanism from undue compression.

When the actuating pressure is reduced, the springs K and L return the casings A and B and the intermediate followers C and D to normal position, the parts of the friction device being restored to normal position by the spring H, as is well known in this art.

My improved mechanism provides the desired light cushioning action to absorb the lighter shocks to which the draft rigging is subjected in service and also effectively takes care of all excessively heavy shocks, the lighter shocks being cushioned by the springs K and L only being compressed during predetermined initial action of the mechanism and the heavy shocks being absorbed by joint action of the spring means and the friction device, in tandem, as the mechanism is compressed to a greater extent.

Referring next to the embodiment of the invention illustrated in Figure 9, the casings A and B hereinbefore described are modified by closing or partly closing the ends of the same which bear on the main followers. In Figure 9 the rear portion of the casing B is illustrated in vertical section. As shown in this figure, the casing is closed at the rear end by a vertical end wall 50 and the springs K and L bear directly on said end wall instead of bearing on the front face of the rear main follower 16 as is the case in the embodiment of the invention illustrated in Figures 1 to 8 inclusive. The front end of the casing A may also be closed by an end wall similar to the wall 50 of the casing B. The view of the casing B in Figure 9 serves to fully illustrate this change of design of the casing A, inasmuch as the two casings A and B are of identical structure.

I have herein shown and described what I now consider the preferred manner of carrying out my invention, but the same is merely illustrative, and I contemplate all changes and modifications that come within the scope of the claims appended hereto.

I claim:

1. In a shock absorbing mechanism for railway draft riggings, the combination with front and rear main followers relatively movable toward each other lengthwise of the mechanism; of front and rear casings bearing respectively on said front and rear main followers; front and rear intermediate followers, said front intermediate follower being longitudinally movable with respect to said front casing and said rear intermediate follower being longitudinally movable with respect to said rear casing; a rearwardly projecting arm on said front casing engaging said rear intermediate follower; a forwardly projecting arm on said rear follower casing engageable with said front intermediate follower but normally spaced therefrom to provide for initial relative longitudinal movement between said front intermediate follower and rear casing; a shock absorbing device interposed between said front main follower and front intermediate follower; and spring means interposed between said rear intermediate and rear main followers.

2. In a shock absorbing mechanism for railway draft rigging, the combination with front and rear main followers relatively movable toward and away from each other lengthwise of the mechanism; of front and rear intermediate followers; a friction shock absorbing device interposed between and engaged by said front main and front intermediate followers; spring means interposed between and bearing on said rear intermediate and rear main followers; a column element transmitting the actuating force from said front main follower to said rear intermediate follower; and a second column element interposed between said rear main follower and the front intermediate follower to transmit the actuating force from said rear main follower to said front intermediate follower after a predetermined compression of said spring means, lost motion being provided between said last named column element and the front intermediate follower to provide for relative movement therebetween to permit said predetermined compression prior to actuation of said intermediate front follower.

3. In a shock absorbing mechanism for railway draft rigging, the combination with front and rear main followers relatively movable toward and away from each other; of front and rear intermediate followers; cushioning means interposed between said front main and front intermediate followers; a second cushioning means interposed between said rear main and rear intermediate followers, one of said cushioning means being a spring device and the other a friction device; and front and rear column members bearing respectively on said front and rear main followers, said front column member having arms extending rearwardly beyond said front intermediate follower, said rear column member having arms extending forwardly beyond said rear intermediate follower, the arms of one of said column members engaging the intermediate follower associated with the spring device, and the arms of the other column member having their outer ends normally spaced from the intermediate follower associated with the friction device, said last named arms being engageable with the last named intermediate follower after a predetermined compression of said spring device to actuate said last named intermediate follower.

4. In a shock absorbing mechanism for railway draft riggings, the combination with a main follower; of a second main follower, said main followers being relatively movable toward and away from each other; a friction shock absorbing device bearing at one end on said first named main follower, said friction device including a friction shell and a cooperating spring resisted friction clutch; an intermediate follower bearing on the other end of said friction device; a column member bearing on said first named main follower, and having arms extending beyond said intermediate follower; a second intermediate follower engaged by said arms; a spring resistance interposed between said second named intermediate follower and the second named main follower; and a second column member bearing on said second named main follower, said second named column member having arms extending beyond the second named intermediate follower and having their outer ends normally spaced from said first named intermediate follower but adapted to engage the same after a predetermined preliminary action of the mechanism.

5. In a shock absorbing mechanism for railway draft riggings, the combination with a main follower; of a second main follower, said main followers being relatively movable toward and away from each other; a column element bearing on said first named main follower and having arms projecting toward said second named main follower; a second column element bearing on said second named main follower and having arms projecting toward said first named main follower, each of said column members having stop shoulders inwardly of the arms thereof; an intermediate follower interposed between the outer ends of the arms of said first named column element and the stop shoulders of said second named column element, said intermediate follower being engaged by said arms and normally spaced from said shoulders; a second intermediate follower interposed between the outer ends of the arms of said second named column element and the stop shoulders of said first named column element, and normally spaced from said last named arms and shoulders; a friction shock absorbing device interposed between and bearing respectively on said first named main follower and second named intermediate follower; and spring means interposed between and bearing on said first named intermediate follower and second named main follower.

6. In a shock absorbing mechanism for railway draft riggings, the combination with a main follower; of a second main follower, said main followers being relatively movable toward and away from each other; a column member bearing at one end on said first named follower and having arms at the other end extending toward said second named main follower; a second column member bearing at one end on said second named main follower and having arms at the other end extending toward said first named main follower; a friction shock absorbing device bearing at one end on said first named main follower; an intermediate follower bearing on the other end of said friction device; a second intermediate follower bearing on the outer ends of the arms of said first named column element, said second named intermediate follower having an opening therethrough; a spring extending through the opening of said second named intermediate follower and bearing at one end on the first named intermediate follower and at the other end on the second named main follower and normally yieldingly holding said first named intermediate follower spaced from the outer ends of the arms of said second named column element; and a second spring interposed between and bearing on said second named intermediate follower and the second named main follower.

7. In a shock absorbing mechanism for railway draft riggings, the combination with a main follower; of a second main follower, said main followers being relatively movable toward and away from each other; a casing bearing on said first named follower; a second casing bearing on said second named main follower; an intermediate follower movable lengthwise within said first named casing; a second intermediate follower movable lengthwise within the second named casing; an arm on said first named casing engaging said second named intermediate follower; an arm on said second named casing engageable with said first named intermediate follower but normally spaced therefrom to provide for initial longitudinal movement between said first named intermediate follower and the second named casing; a friction shock absorbing device interposed between said first named main follower and first named intermediate follower; and spring means interposed between said second named main follower and said second named intermediate follower.

8. In a shock absorbing mechanism for railway draft riggings, the combination with a casing; of a second casing, said casings being movable toward and away from each other lengthwise of the mechanism; an intermediate follower engaged by said first named casing and movable therewith; a second intermediate follower normally spaced from said second named casing and adapted to be engaged thereby and actuated after a predetermined compression of the mechanism; a friction shock absorbing device adapted to be actuated by said second named intermediate follower; and a shock absorbing spring actuated by said first named intermediate follower.

9. In a shock absorbing mechanism for railway draft riggings, the combination with a casing having a transverse end wall at its outer end; of a second casing having a transverse end wall at its outer end, each of said casings having arms projecting toward the other casing, said casings being movable toward and away from each other lengthwise of the mechanism; an intermediate follower engaged by the arms of said first named casing; a second intermediate follower engageable by said arms of the second named casing after a predetermined compression of the mechanism; a spring device within said second named casing bearing on said first named intermediate follower; and a friction shock absorber within said first named casing bearing on said second named intermediate follower.

10. In a shock absorbing mechanism for railway draft riggings, the combination with a column element arranged lengthwise of the mechanism; of a second column element opposed to said first named column element and arranged lengthwise of the mechanism, said column elements having arms extending lengthwise of the mechanism, said arms of each element projecting toward the other element and being in sliding engagement with the arms of the latter, each column element having stop shoulders inwardly of the arms thereof; a follower interposed between the outer ends of the arms of said first named element and the stop shoulders of said second named element, said follower being engaged by said arms of the first named element and normally spaced from the shoulders of said second named element; a second follower interposed between the outer ends of the arms of said second named element and the stop shoulders of said first named element and normally spaced from said arms of said second named element and the shoulders of said first named element; a spring bearing on said first named follower and opposing movement thereof toward said second named element; a second spring extending through said first named follower and bearing on said second named follower and opposing movement of the latter toward the second named column element; and a friction shock absorbing device of greater shock absorbing capacity than said second named spring bearing on said second named follower and opposing movement of the same toward said first named column element.

11. In a shock absorbing mechanism for railway draft riggings, the combination with a friction shock absorbing device; of a shock absorbing spring; a follower against which said friction shock absorbing device bears; stop means from which said follower is normally spaced; and means for compressing said spring and simultaneously moving said friction device and follower toward said stop means, thereby compressing the spring only during initial action of the mechanism and until said follower is arrested by said stop means to effect compression of said friction device and spring in tandem during further actuation of the mechanism.

12. In a shock absorbing mechanism for railway draft riggings, the combination with a friction shock absorbing device; of a spring; a follower bearing on the inner end of the friction device; a second follower bearing on the inner end of said spring; pressure transmitting means adapted to receive the actuating force and engaging said friction device to actuate the same; column means extending from said pressure transmitting means engaging the said second named follower to transmit the actuating force thereto; and abutment means bearing on the outer end of said spring; and column means extending from said abutment means and normally spaced from said first named follower and engageable with the latter after a predetermined relative movement of said first named follower and column means to hold said first named follower against movement toward said abutment means.

ROLAND J. OLANDER.